US009860554B2

(12) United States Patent
Samuelsson et al.

(10) Patent No.: US 9,860,554 B2
(45) Date of Patent: Jan. 2, 2018

(54) MOTION ESTIMATION FOR UNCOVERED FRAME REGIONS

(71) Applicant: TELEFONAKTIEBOLAGET LM ERICSSON (PUBL), Stockholm (SE)

(72) Inventors: Jonatan Samuelsson, Stockholm (SE); Kenneth Andersson, Gävle (SE); Clinton Priddle, Carindale (AU)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 14/977,839

(22) Filed: Dec. 22, 2015

(65) Prior Publication Data

US 2016/0112717 A1    Apr. 21, 2016

Related U.S. Application Data

(63) Continuation of application No. 12/524,281, filed as application No. PCT/SE2008/050034 on Jan. 14, 2008, now abandoned.

(Continued)

(51) Int. Cl.
*H04N 19/527* (2014.01)
*H04N 19/513* (2014.01)
(Continued)

(52) U.S. Cl.
CPC ............ *H04N 19/527* (2014.11); *G06T 7/20* (2013.01); *H04N 19/132* (2014.11);
(Continued)

(58) Field of Classification Search
CPC ....... G06T 7/20; G06T 7/0081; H04N 19/132; H04N 19/513; H04N 19/527;
(Continued)

(56) References Cited

U.S. PATENT DOCUMENTS 4,772,947 A * 9/1988 Kono ............... H04N 19/98
375/240.24
5,510,834 A * 4/1996 Weiss ............... H04N 5/145
348/699

(Continued)

FOREIGN PATENT DOCUMENTS

EP      1 339 234 A2    8/2003
EP        1376471 A1 *  1/2004  .......... G06T 7/2006
(Continued)

OTHER PUBLICATIONS

Murat, et al. Two Dimensional Mesh-Based Visual-Object Representation for Interactive Synthetic/Natural Digital Video. Proceedings of the IEEE, Jan. 6, 1998.

*Primary Examiner* — Behrooz Senfi
(74) *Attorney, Agent, or Firm* — Patent Portfolio Builders, PLLC

(57) ABSTRACT

In a motion estimation for a group of at least one image element in a frame of a video sequence, a global motion is determined between the frame and a reference frame. Uncovered groups present in an uncovered region of the frame are identified based on the determined global motion. The global motion is assigned as motion representation for these identified uncovered groups. The assigned motion representation is useful for constructing new frames in the sequence in a frame rate up-conversion.

13 Claims, 7 Drawing Sheets

Related U.S. Application Data

(60) Provisional application No. 60/897,511, filed on Jan. 26, 2007.

(51) Int. Cl.
  *G06T 7/20*  (2017.01)
  *H04N 19/132*  (2014.01)
  *H04N 19/553*  (2014.01)
  *H04N 19/587*  (2014.01)
  *H04N 19/172*  (2014.01)

(52) U.S. Cl.
  CPC ......... *H04N 19/172* (2014.11); *H04N 19/513* (2014.11); *H04N 19/553* (2014.11); *H04N 19/587* (2014.11)

(58) Field of Classification Search
  CPC .. H04N 19/553; H04N 19/587; H04N 19/176; H04N 19/52
  USPC .................................................... 375/240.16
  See application file for complete search history.

(56) References Cited

U.S. PATENT DOCUMENTS

| | | | |
|---|---|---|---|
| 5,929,940 A * | 7/1999 | Jeannin | H04N 19/543 348/699 |
| 6,192,080 B1 | 2/2001 | Sun et al. | |
| 6,249,613 B1 * | 6/2001 | Crinon | H04N 19/61 375/E7.081 |
| 6,618,439 B1 | 9/2003 | Kuo et al. | |
| 6,751,350 B2 | 6/2004 | Crinon et al. | |
| 6,940,910 B2 * | 9/2005 | Jun | G06K 9/00765 348/E5.067 |
| 7,072,398 B2 * | 7/2006 | Ma | H04N 19/51 348/416.1 |
| 7,254,268 B2 * | 8/2007 | Zhao | G06K 9/46 345/604 |
| 7,551,673 B1 * | 6/2009 | Oh | H04N 19/56 348/413.1 |
| 7,574,070 B2 * | 8/2009 | Tanimura | G06K 9/00362 345/632 |
| 7,720,150 B2 | 5/2010 | Lee et al. | |
| 2003/0103568 A1 * | 6/2003 | Lee | H04N 7/014 375/240.16 |
| 2003/0161403 A1 * | 8/2003 | Yang | H04N 5/145 375/240.16 |
| 2004/0047415 A1 | 3/2004 | Robert et al. | |
| 2004/0105493 A1 | 6/2004 | Kondo et al. | |
| 2005/0094852 A1 * | 5/2005 | Kumar | H04N 19/61 382/107 |
| 2006/0018383 A1 * | 1/2006 | Shi | G06T 7/2006 375/240.16 |
| 2006/0274156 A1 * | 12/2006 | Rabbani | H04N 5/23248 348/208.99 |

FOREIGN PATENT DOCUMENTS

| | | |
|---|---|---|
| EP | 1 736 929 A2 | 12/2006 |
| JP | H08-018974 A | 1/1996 |
| WO | WO 02/085026 A1 | 10/2005 |
| WO | WO 2006/054257 A1 | 5/2006 |

* cited by examiner

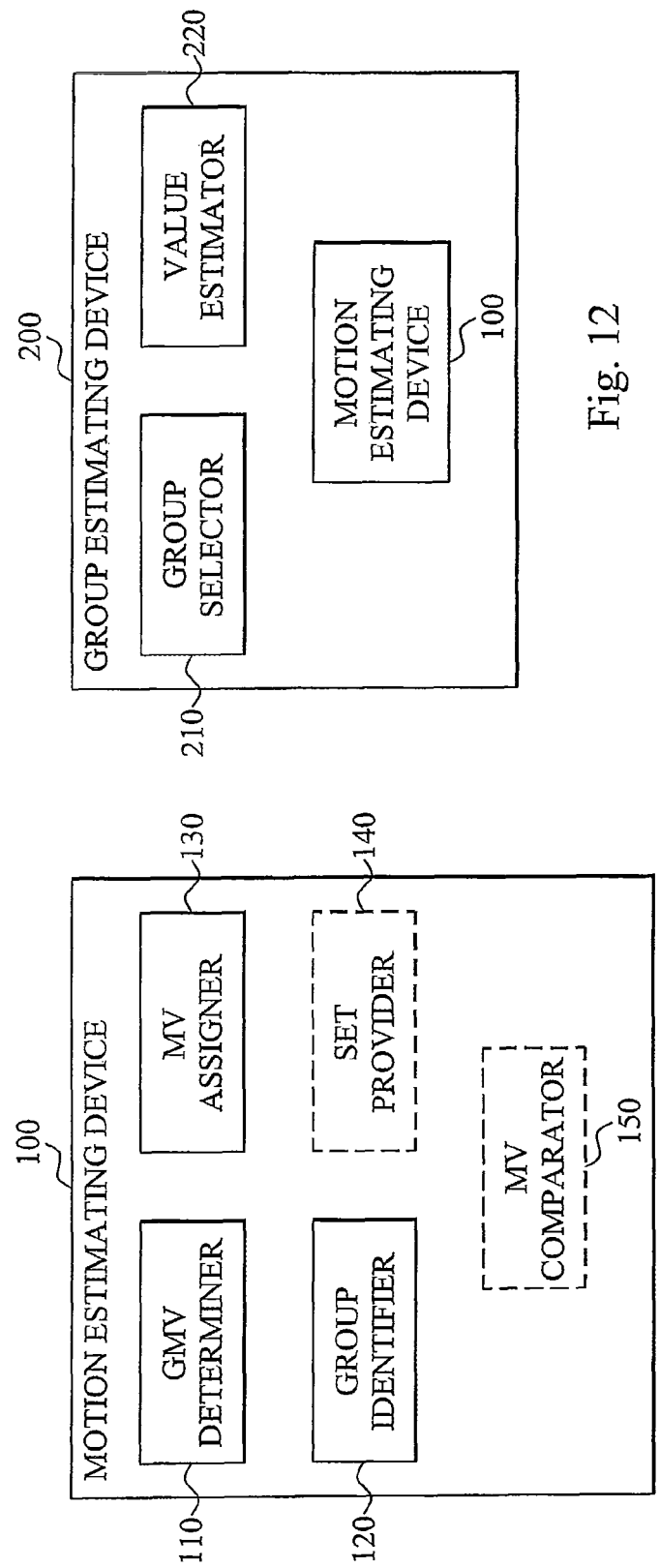

MOTION ESTIMATION FOR UNCOVERED FRAME REGIONS

RELATED APPLICATIONS

This application is a continuation of co-pending U.S. patent application Ser. No. 12/524,281 filed Jul. 23, 2009, which is a 371 of International Application No. PCT/SE2008/050034, filed Jan. 14, 2008, which claims benefit of U.S. Provisional Application No. 60/897,511 filed Jan. 26, 2007, the disclosures of which are fully incorporated herein by reference.

TECHNICAL FIELD

The present invention generally relates to image processing, and in particular to motion estimation for uncovered regions in images.

BACKGROUND

The motivation of frame rate up-conversion is that a video sequence with higher frame rate is generally considered to give higher quality experience than a video sequence with lower frame rate. The frame rate of a video sequence can be increased by inserting predicted frames in between existing frames. A good approach is to predict the in-between frame using bidirectional block based motion estimation, searching for linear motions between the previous frame and the next frame in the input video sequence. It is possible to use non-linear approaches that can represent acceleration, but the linear approach is used because of its simplicity and low complexity. The in-between frame is divided into blocks and to each of these a motion vector must be assigned in some way.

A problem or short-coming with many frame rate up-conversion algorithms is the handling of panning, rotating or zooming images. In FIG. 1, the camera pans to the left when going from image 20 to image 10, thus a new area becomes revealed along the left border of the image 10. There are parts of the audience and almost a whole commercial sign in the bottom image 10 that are not part of the top image 20. These "new" areas generally do not have any accurate references to the previous image 20. In clear contrast, pixel blocks in the new areas are typically encoded according to intra mode, or if being inter encoded, having motion vectors pointing to areas in the previous image 20 that look similar but will not represent the actual motion (the camera pan). The lack of accurate motion vectors for these pixel blocks makes rate up-conversion harder, possibly leading to visual artefacts in interpolated images.

Document [1] discusses the identification of a block Bi as an uncovered region, when it can be seen in a frame Ft to be determined and in a following frame Ft+1 but not in a previous frame Ft−1. Such a block is encoded as an intra block and has not been motion compensated by other blocks.

SUMMARY

Document [1] handles uncovered blocks but assumes an intra coding for the uncovered pixels. This means that the uncovered blocks do not have any motion vectors that can be used during frame rate up-conversion.

The present invention overcomes these and other drawbacks of the prior art arrangements.

It is a general object of the present invention to provide an identification of image elements in an uncovered region of a video frame.

It is another object of the invention to provide a motion estimation of identified uncovered groups of image elements.

These and other objects are met by the invention as defined by the accompanying patent claims.

Briefly, the present invention involves identification and motion estimation for groups of image elements in an uncovered region of a frame in a video sequence. This uncovered region comprises image elements or pixels that are not present in a previous frame of the video sequence, such as due to camera panning, zooming or rotation.

A representation of a global motion of image element property values from at least a portion of a reference frame, typically a previous frame, in the video sequence to at least a portion of a current frame is determined. The determined global motion representation is used for identifying uncovered groups in the current frame, i.e. those groups comprising at least one image element present in the uncovered region of the frame. Preferably, an uncovered group is identified as a group in the current frame that does not have any associated group in the reference frame when applying the global motion from the group in the frame towards the reference frame. Typically, the global motion instead points outside of the border of the reference image.

The motion estimation of the present invention then assigns the determined global motion as motion representation for the identified uncovered groups. This means that also these groups that traditionally are not assigned any "true" motion vectors will have motion representations that can be used, for instance, during frame rate up-conversion.

In a preferred embodiment, a border uncovered group present on the border between the uncovered region of the frame and the remaining frame regions is investigated for the purpose of re-assigning a local motion instead of the global motion. In such a case, the motion representations of neighboring groups present in the remaining frame portion are compared to the global motion and preferably each other. If certain criteria are fulfilled, i.e. at least a minimum number of the neighboring motion representations differ significantly from the global motion and this at least minimum number of neighboring motion representations do not significantly differ from each other, the uncovered group is re-assigned a local motion representation determined based on the neighboring motion representation(s).

The present invention therefore allows assigning motion representations to also uncovered groups in a frame. These motion representations are useful during frame rate up-conversion for the purpose of identifying reference frames that are used when determining property values of the image elements of a group in a frame to be constructed.

SHORT DESCRIPTION OF THE DRAWINGS

The invention together with further objects and advantages thereof, may best be understood by making reference to the following description taken together with the accompanying drawings, in which.

Figure 7:
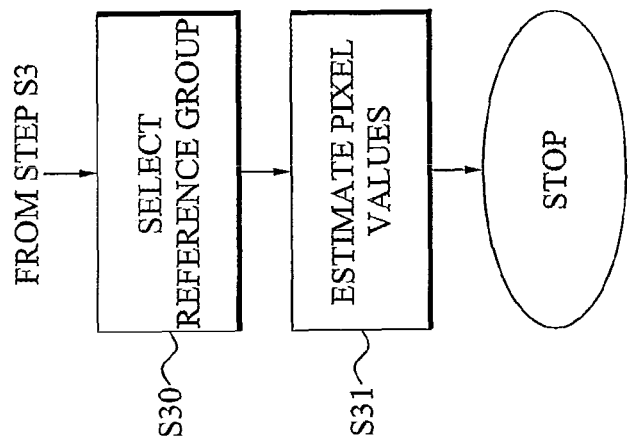
Figure 6:
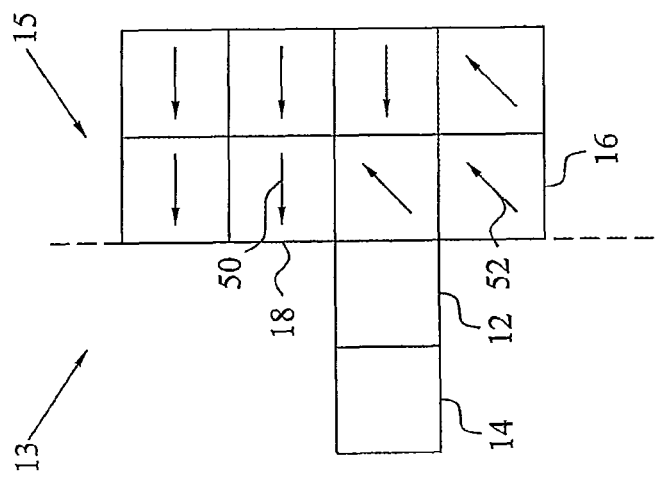
Figure 9:
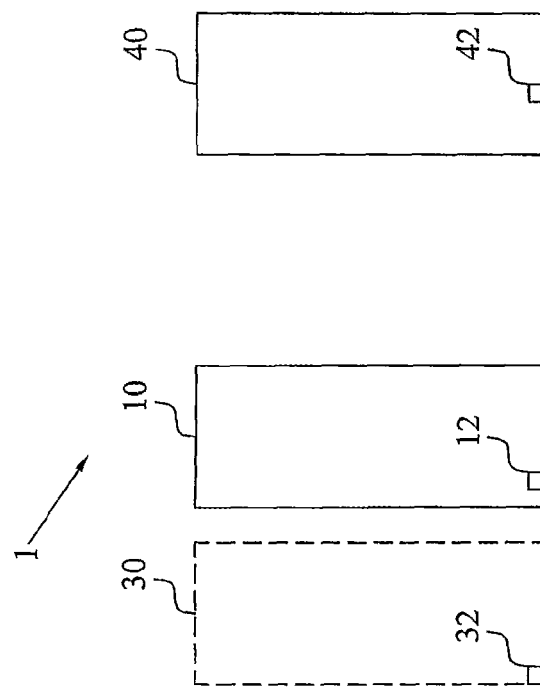
Figure 8:
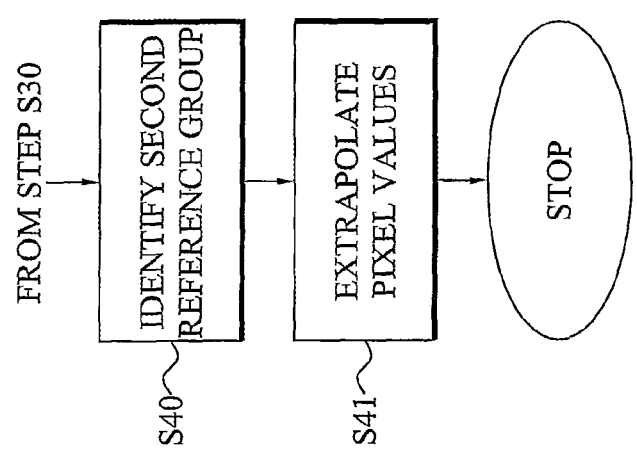
Figure 10:
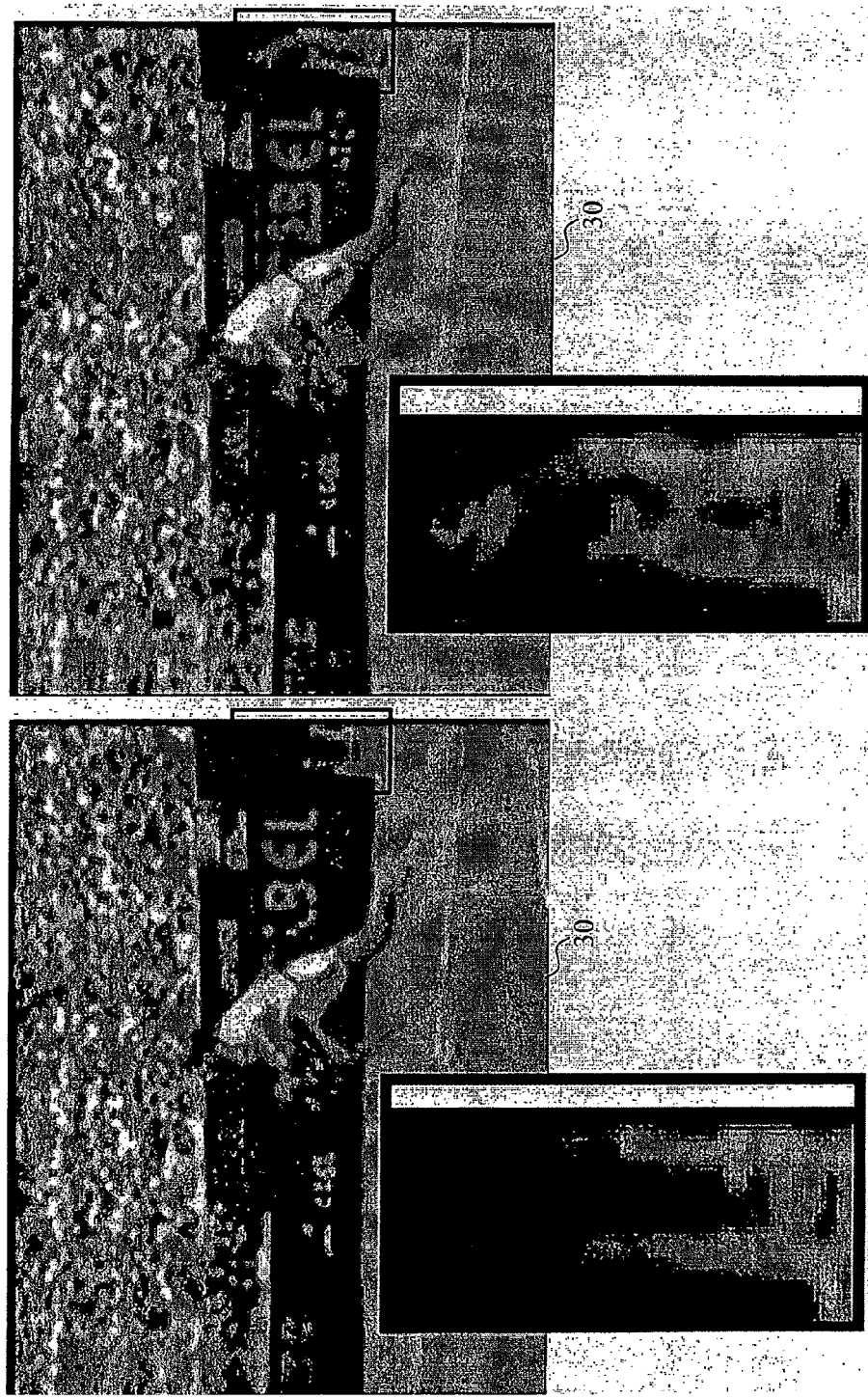

FIG. 6 schematically illustrating assignment of local motion representations according to an embodiment of the present invention;

FIG. 7 is a flow diagram illustrating a method of estimating property values according to an embodiment of the present invention;

FIG. 8 is a flow diagram illustrating an embodiment of the estimating step in the estimating method of FIG. 7;

FIG. 9 is a diagram illustrating adjacent frames in a video sequence;

FIG. 10 illustrating the gains of employing the present invention in frame rate-up conversion and the problems of prior art techniques;

FIG. 11 is a schematic block diagram of a motion estimating device according to the present invention; and FIG. 12 is a schematic block diagram of a group estimating device according to the present invention.

DETAILED DESCRIPTION

Throughout the drawings, the same reference characters will be used for corresponding or similar elements.

The present invention generally relates to image processing and in particular to methods and devices for handling groups of image elements in uncovered regions of images and frames in a video sequence.

In the present invention, a video or frame sequence comprises multiple, i.e. at least two, frames or images. Such a frame can in turn be regarded as composed of a series of one or more slices, where such a slice consists of one or more macroblocks of image elements or pixels. In the present invention, the expression "image element" is used to denote a smallest element of a frame or image in a sequence. Such an image element has associated image element properties, such as color (in the red, green, blue, RGB, space) or luminance (Y) and chrominance (Cr, Cb or sometimes denoted U, V). A typical example of an image element is a pixel of a frame or picture. The present invention is particularly adapted to a video sequence comprising multiple consecutive frames at a given frame rate.

The image elements are organized into groups of image elements. The expression "group of image element" denotes any of the prior art known partitions of frames and slices into collections of image elements that are handled together during decoding and encoding. Generally, such a group is a rectangular (M×N) or square (M×M) group of image elements. An example of such a grouping is a macroblock in the video compression standard. Such a macroblock generally has a size of 16×16 image elements. A macroblock can consists of multiple so-called sub-macroblock partitions, such as 16×8, 8×16, 8×8, 8×4, 4×8 and 4×4 image elements. The 8×8 sub-macroblock partition is often denoted as a sub-macroblock or sub-block, whereas a 4×4 partition is often denoted block.

So-called uncovered regions in an image or a frame correspond to image elements that have no correspondences in a previous frame of the video sequence. Uncovered regions typically occur during panning, zooming and/or rotation in video recording causing new objects to be captured in the video sequence. In order to reduce the bit size of a video sequence, the frames are encoded according to well known techniques, such as intra or inter coding [2]. Inter coding generally leads to a more efficiently coded block in terms of the number of bits spent on the inter-encoded block as compared to intra coding. However, inter coding presumes that there is a correspondence or at least a (closely) matching reference in another frame of the video sequence that can be used as starting reference for a current block. If no such match can be found, the block is generally intra coded, thereby requiring a comparatively larger amount of bits.

Image elements in uncovered regions do not have any correspondences in previous frames. As a consequence, these may be intra coded or a best effort inter coding can be conducted even though no correct matches are available. This generally works well and gives a visually acceptable result during subsequent decoding and rendering. However, if the video sequence is subsequent to frame rate-up conversion, serious problems in terms of unacceptable visual appearance of the constructed intermediate frames can occur in the case of inter coding utilizing "untrue" motion representations for uncovered image elements.

FIG. 10 illustrates a determined frame 30 that is constructed to be intermediate of two frames in a video sequence. The right portion of the frame 30 illustrates a linesman that is further illustrated in the magnified portion. As is seen in the left figure, portions of this linesman have been assigned colors that are clearly incorrect to the viewer. Such problem may occur when utilizing inter coding according to prior techniques together with frame rate-up conversion.

The present invention reduces the risk of such visual errors by providing a method for performing motion estimation for a group of at least one image element in a frame of a video sequence. The operation steps of the method are illustrated in the flow diagram of FIG. 2. The method starts in step S1, which determines a representation of a global motion of image element property values from at least a reference portion of a reference frame to at least a portion of a current frame in the frame/video sequence. This global motion representation is indicative of the global or overall movement of pixels when going from the reference frame to the current frame in the sequence.

Figure 1:
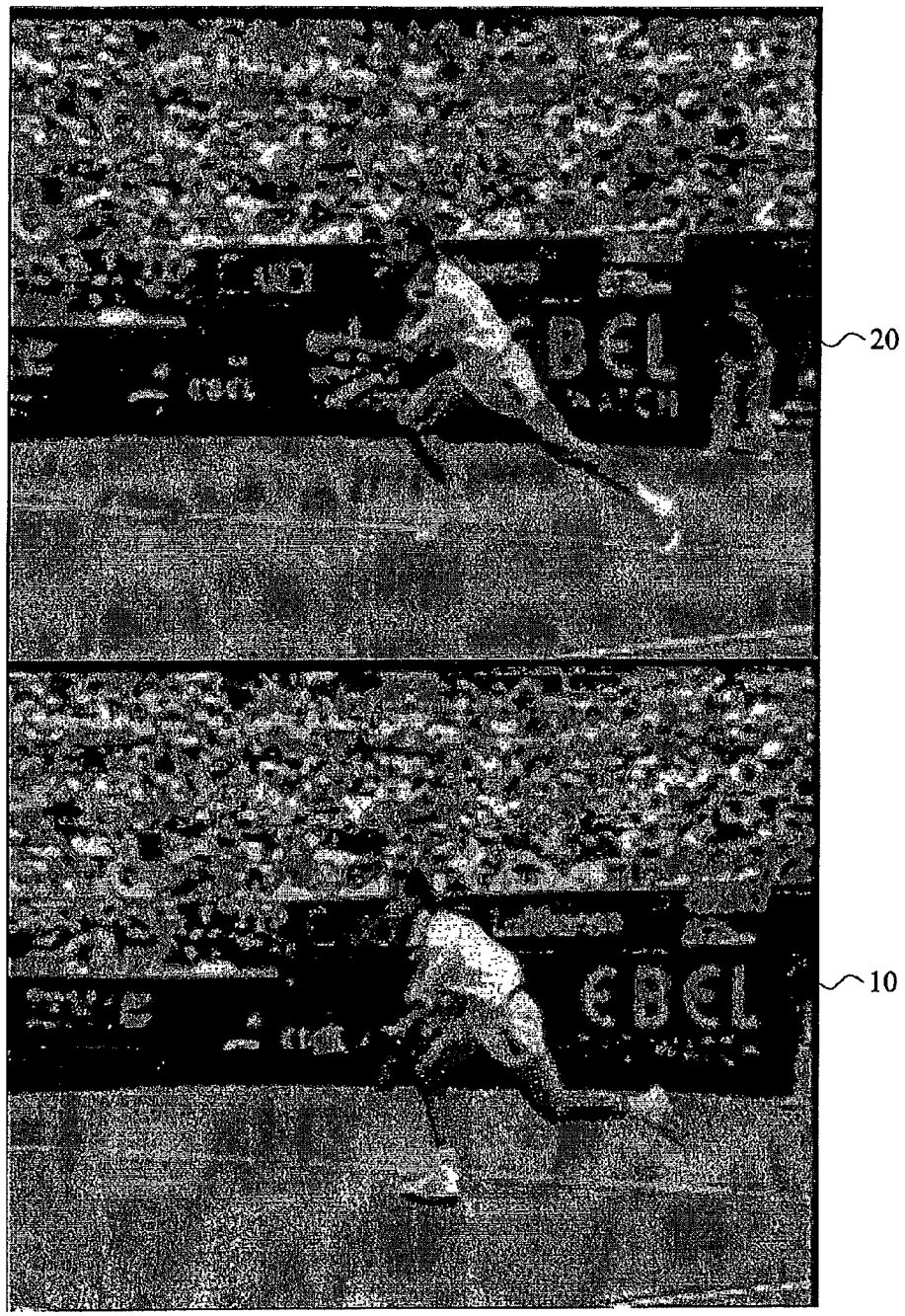
FIG. 1 is a drawing illustrating two image frames in a video sequence.
Figure 3:
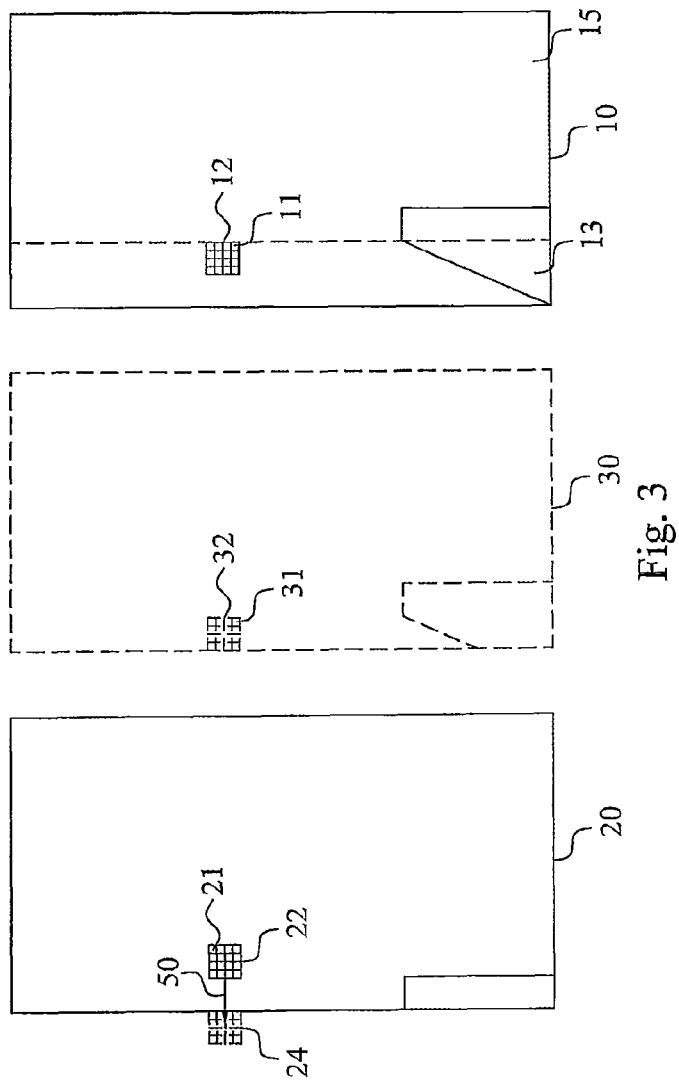
FIG. 3 is a diagram illustrating adjacent frames in a video sequence.

A next step S2 uses the determined global motion representation for identifying at least one so-called uncovered group of at least one image element each. These uncovered groups are present in an uncovered region of the frame. Thus, the at least one group comprises image elements that are not present in a previous frame of the video sequence. A preferred implementation of this step S2 identifies an uncovered group as a group in the current frame that does not have an associated group in a previous frame when applying the global motion from the group in the current frame to the previous frame. In other words, if the global motion is to be utilized as a motion or displacement vector for the uncovered group in the previous frame, the global motion will indeed point towards a (imaginary) group present outside of the boundaries of the previous frame. This situation is illustrated in FIG. 3. The leftmost frame 20 corresponds to a previous frame of a previous time instance in the video sequence 1 relative a current frame 10. The picture has been panned when going from the previous 20 to the current 10 frame, thereby uncovering a region 13 of image elements 11 not present in the previous frame 20. In this case, the global motion 50 is a vertical motion from the right to the left.

In order to determine whether a current group 12 of image elements 11 is an uncovered group and belongs to the uncovered region 13 of the frame 10, it is checked whether the determined global motion representation 50 as applied to the current group 12 points outside the border of the previous frame 20. In such a case, the current group 12 belong to the uncovered region 13 otherwise it corresponds to a remaining portion 15 of the current frame 10. Alternatively, the group 22 of image elements 21 occupying the same position in the previous frame 20 as the current group 12 occupy in the current frame 10 is identified. The group 22 is then moved according to the determined global motion representation 50 to reach a final group position 24. If this position 24 falls outside of the frame boundary 20, the current group 12 belongs to the uncovered region 13 otherwise it corresponds to the remaining portion 15 of the current frame 10.

Once an uncovered group has been identified in step S2, the method continues to step S3, where the determined global motion representation is as assigned as motion or displacement estimation for the uncovered group. Thus, the uncovered group thereby becomes assigned a displacement representation that can be subsequently used for different purposes, such as when constructing a new frame during frame rate-up conversion, which is further described herein.

In a preferred embodiment of the present invention, all or at least a portion of the image element groups in the frame can be tested by utilizing the global motion representation in order to determine whether the groups belong to an uncovered frame region or a remaining region. In such a case, all groups identified as uncovered groups in step S2 are preferable assigned the global motion representation as their motion estimation. This means that steps S2 and S3 are preferably performed multiple times, either in series or parallel, for different groups in the frame.

The global motion representation of the present invention can take any vector value $$v = \begin{bmatrix} x \\ y \end{bmatrix},$$

ranging from the zero vector up to non-zero values for the vector components x and y, depending on how the pixel parameter values are moved when going from the reference frame to the current frame in the sequence.

Figure 4:
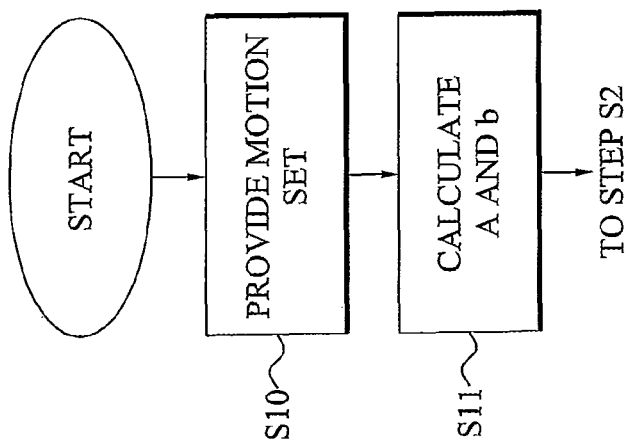
FIG. 4 is a flow diagram illustrating additional steps to the estimating method of FIG. 2.

FIG. 4 is a flow diagram illustrating a preferred embodiment of determining the global motion representation of the present invention. The method starts in step S10, where a vector set is provided. This vector set comprises, for each image element group in at least a portion of the current frame a respective associated displacement or motion vector referring to a reference group of at least one image element in the reference frame. Thus, each group in at least a portion of the current frame, preferably each group in the frame, has an assigned displacement vector that is pointing to or associated with a reference group in the reference frame.

The displacement vectors can be provided from a coded motion vector field of a video codec, such as H.264. Such motion vectors are traditionally used in inter coding of frames and can be re-used but for another purpose according to the invention. If no such motion vectors are available from the video codec, they can be determined from a motion estimation search. In such a case, a dedicated motion estimation search is conducted, preferably according to prior art algorithms but for the purpose of generating a motion vector set that can be used for determining the global motion representation of the invention.

Generally, each image element group in the remaining portion of current frame can have an associated motion vector generated by the video codec or from the motion estimation. However, some of the groups, such as those belonging to the uncovered region, might not have an assigned motion vector as these are could be coded as intra blocks by the video codec. In such a case, such groups can be omitted from the processing of the motion vectors of the invention. This means that only a portion (though a major portion) of the groups in the current frame and their assigned motion/displacement vectors are utilized in the following step S11 for calculating the global motion representation.

The next step S11 uses the displacement vectors from the provided (fetched or calculated) vector set from step S10 to determine a global motion vector. In a simple implementation, the global motion representation is determined as an average vector of the displacement vectors in the vector set. This is a computationally simple embodiment, though far from optimal for the purpose of obtaining an accurate global motion representation. Therefore, in a preferred embodiment of step S11, a position-dependent global motion vector or representation having vector component values that can vary for different image element positions in the current frame, i.e. v=v (x,y), is determined in step S11.

A preferred implementation of step S11 utilizes the following representation of the global motion representation:

$$v = Ax + b$$

where $$x = \begin{bmatrix} x \\ y \end{bmatrix}$$

is the position of a current group in the current frame, $$v = \begin{bmatrix} v_x \\ v_y \end{bmatrix}$$

is the global motion representation of the current group, $$A = \begin{bmatrix} a_{11} & a_{12} \\ a_{21} & a_{22} \end{bmatrix} \text{ and } b = \begin{bmatrix} b_1 \\ b_2 \end{bmatrix}$$

are a matrix and a vector that are to be estimated based on the displacement vectors provided in step S10. In order to calculate the values for the matrix A and the vector b, a least square method is preferably used for the provided displacement vector. Thus, the matrix and vector that gives a best result, in terms of minimizing a squared difference between the displacement vectors and the global motion representation, are estimated in step S11. The final global motion representation v=Ax+b captures most common background motions, such as camera panning, zooming and rotation.

The above concept can of course be applied to other parameterizations of a global motion representation, such as $$v = \begin{bmatrix} a_{11} & a_{12} \\ a_{21} & a_{22} \end{bmatrix} \begin{bmatrix} x^2 \\ y^2 \end{bmatrix} + \begin{bmatrix} b_{11} & b_{12} \\ b_{21} & b_{22} \end{bmatrix} \begin{bmatrix} x \\ y \end{bmatrix} + \begin{bmatrix} c_1 \\ c_2 \end{bmatrix}$$

or higher order components. The method then continues to step S2 of FIG. 2, where the determined representation of the global motion is applied, using the group coordinates x and y of the current group to calculate the global motion at that point and determine whether the group is an uncovered group or not.

The usage of displacement vectors from the video codec or from a dedicated motion estimation search is a particular embodiment of obtaining a displacement vector set that are used for determining a global motion representation of the present invention. Other embodiments can instead be used and are contemplated by the invention. For instance, a motion estimation that is based on phase correlation can be used to obtain a representation of the global motion. Another example is of motion estimation for the global motion is pel-recursive, i.e. pixel-based motion estimation.

Figure 2:
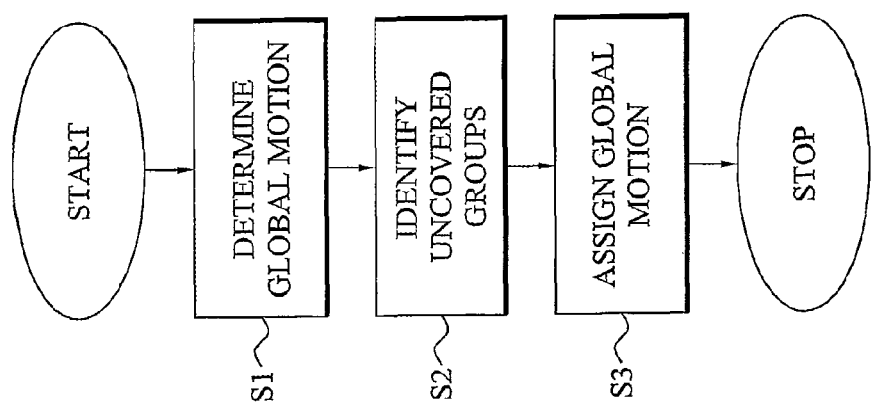
FIG. 2 is a flow diagram of a motion estimation method according to an embodiment of the present invention.
Figure 5:
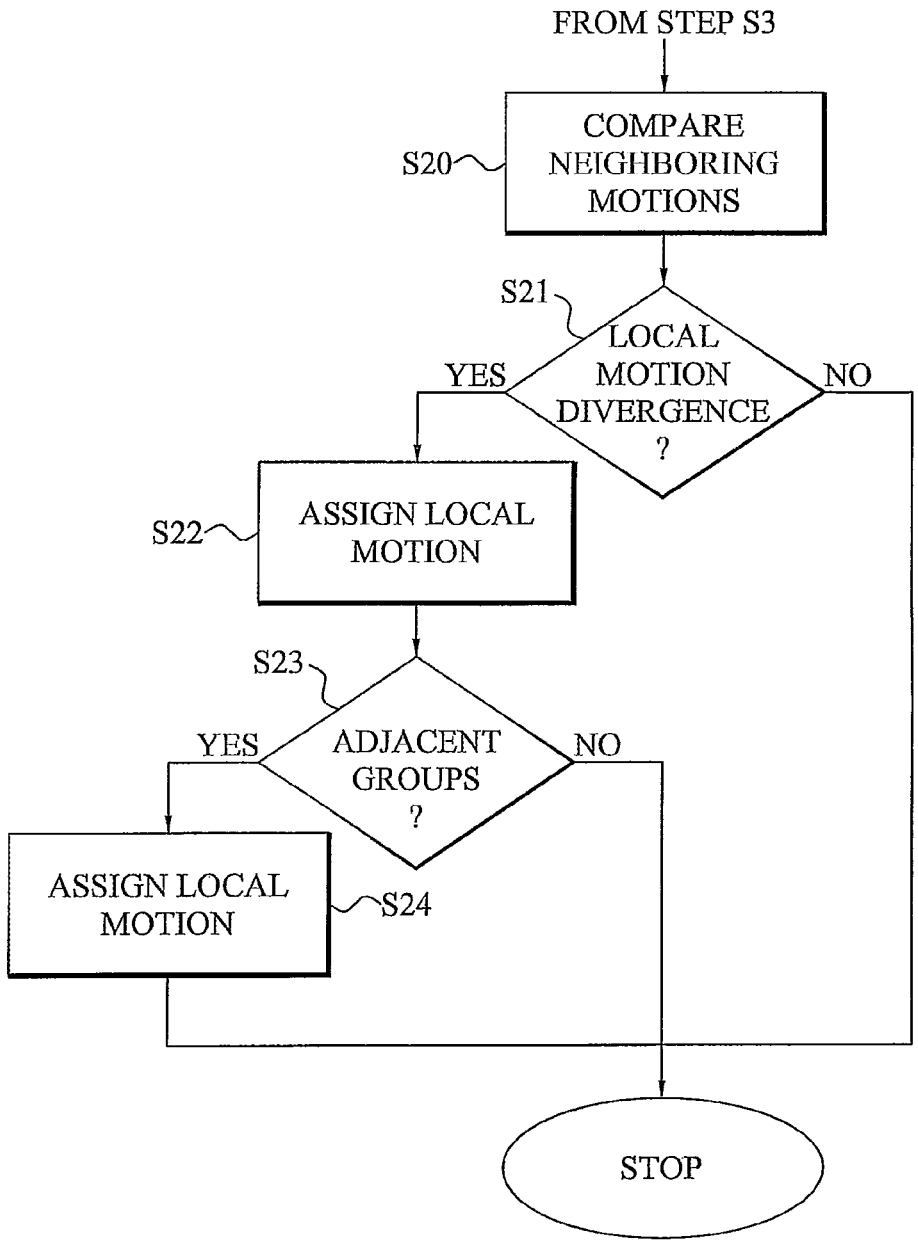
FIG. 5 is a flow diagram illustrating additional steps to the estimating method of FIG. 2.

FIG. 5 is a flow diagram illustrating additional steps of a preferred embodiment of the motion estimating method of FIG. 2. The method continues from step S3 of FIG. 2. A next step S20 is performed for a group identified as belonging to the uncovered region of the frame. Furthermore, the uncovered group has a set of neighboring groups in the frame identified as not belonging to the uncovered region. Thus, the uncovered group is present in the border between the uncovered frame region and the remaining region, where the neighboring groups of the set are found in the remaining frame region.

As was discussed above, the groups present in the remaining portion of the frame are preferably each associated with a displacement or motion representation. These motion representations can be available from a coded motion vector field of the video codec or from a dedicated motion estimation search. Step S20 compares the motion representations associated with the neighboring groups with the determined global motion representation. A next step S21 determines whether there is a local motion diverging from the global motion in the vicinity of the uncovered group. Thus, the step S21 determines whether at least a minimum number of the motion representations differ from the global motion representation as applied to these group positions with at least a minimum difference. FIG. 6 is an illustration of a portion of a frame showing the border between an uncovered region 13 and a remaining frame region 15. A current uncovered group 12 is under investigation. This group comprises three neighboring groups 16, 18 not present in the uncovered region 13 (and five neighboring groups 14 present in the uncovered region 13). Each of these non-uncovered neighboring groups 18, 16 has an associated motion representation 50, 52. In this example, one of the neighboring groups 18 has a motion representation 50 that is identical or near identical to the global motion representation for the frame when applied at the position of the group 18. However, the remaining two neighboring groups 16 have motion representations 52 that significantly differ from the global motion representation 50. This means that two thirds of the neighboring groups present a local motion divergence.

In a typical implementation, the minimum number of neighboring groups that must have motion representations differing from the global motion in order to have a local motion divergence in step S21 is preferably more than half of the neighboring groups. In most typical cases with a horizontal or vertical border between uncovered 13 and remaining 15 frame portion, an uncovered group 12 has three or two neighboring groups 16, 18 in the remaining portion. In the former case, at least two of them must have motion representations differing from the global motion in order to have a local motion divergence. In the latter case, all of the neighboring groups should present this divergence.

A difference between the motion representations of the neighboring groups and the global motion can be determined according to different embodiments. In a first case, only the relative directions of the vectors are investigated. In such a case, an angle $\theta$ between the global motion v and a motion representation d can be determined as:

$$\theta = \arccos\left(\frac{v \cdot d}{|v||d|}\right)$$

This angle $\theta$ can then be compared to a reference angle $\theta_{ref}$ and if the difference between the two angles exceed a minimum threshold or if the quotient of the angels exceeds (or is below) a threshold, the motion representation d is regarded at differing from the global motion representation v with at least a minimum difference.

Another implementation would be to calculate a difference vector q between the motion representation and the global motion:

$$q = v - d$$

If the length of this difference vector (|q|) exceeds a minimum threshold, the motion representation d is regarded at differing from the global motion representation v with at least a minimum difference. This can be implemented by comparing the X and Y values separately with the global motion. If both the X component and the Y component of d differs less than the minimum threshold from corresponding components of v, the motion representation d is regarded as describing the same motion as the global motion representation v, otherwise the motion representation differs significantly from the global motion representation.

In a preferred implementation, not only a minimum number of the neighboring groups should have motion representations differing significantly from the global motion to have a local motion divergence in step S21. A further preferred condition is that motion representations that significantly differ from the global motion should not significantly differ from each other. This is also illustrated in FIG. 6. The two neighboring groups 16 with motion representations 52 differing from the global motion 50 have indeed parallel and equal respective motion representations 52. The difference therebetween is therefore zero degrees or the zero difference vector, depending on the particular difference investigating embodiment to use.

The same tests that were described above can also be utilized for determining differences between the relevant motion representations 52. In such a case, the angles between pairwise tested motion representations should not exceed a maximum angle or the difference vector between pairwise tested motion representations should not have a vector length exceeding a maximum length. If at least a minimum number of the representations fulfill these conditions, we have a local motion divergence in step S21 otherwise not. The minimum number could be more than half of the motion representations that differ significantly from the global motion, i.e. the two motion representations 52 in the example of FIG. 6 should not differ significantly from each other. Alternative no of the motion representations must significantly differ from any other tested motion representation.

If there is a local motion divergence in step S21 that fulfills the one or preferably the two criteria listed above, i) a first minimum number of motion vectors differ significantly from the global motion and ii) of these motion vectors at least a second minimum number of motion vectors must not significantly differ from each other, the method continues to step S22 otherwise it ends.

Step S22 assigns a motion representation provided from the motion vector associated a neighboring group as motion estimation for the tested uncovered group. This means that the previously assigned (in step S3 of FIG. 2) global motion representation is replaced for the current uncovered group by the motion representation associated with a neighboring group or a motion representation calculated therefrom. The motion representation could be any of the representations of the relevant neighboring groups fulfilling the single criterion i) or, in the case of requiring the two criteria i) and ii), fulfilling the two criteria. Also more elaborated embodiments can be utilized, such as determining an average motion representation based on the neighboring motion representations fulfilling criterion i) or criteria i) and ii). This average local motion representation is then assigned to the uncovered group in step S22.

A next optional step S23 investigates whether there are any more uncovered groups on the same row or column as the current uncovered group. In this embodiment, a same row is investigated if the border between the uncovered and remaining frame portions is vertical and a column is investigated for a horizontal border. FIG. 6 illustrates one additional group 14 present on the same row as the uncovered group 12 in the case of a vertical border. In such a case, the newly assigned local motion representation assigned to the uncovered group in step S22 is also assigned to this (these) adjacent group(s) in step S24. These steps S23 and S24 are preferably performed for each uncovered group being assigned a local motion representation instead of the global motion representation in step S22.

Preferably all identified uncovered groups of the same row or column are assigned the same local motion representation as the uncovered group present next to the border between the uncovered and remaining frame portions. In a more elaborated embodiment, a trend in the local motion along the same row or column but over the uncovered-remaining border is utilized for determining local motion representations to uncovered groups. In such a case, a linear extrapolation of the motion representations is calculated for the uncovered groups to thereby more accurately reflect local changes in the motion along a row or column. Information of the motion representations of a set comprising the N groups present on the same row or column and being closest to the border to the uncovered frame portion but still present in the remaining portion can be used in this extrapolation, where N is some multiple integer, such as two or three.

By employing the teachings of the present invention, all groups in a frame will be associated with a motion representation; the ones in the remaining frame group get their motion representations from the video codec or a dedicated motion search and the uncovered groups are assigned the global motion representation or re-assigned a local motion representation according to the present invention.

The assignment of motion representations to all or at least a vast majority of the groups in the frame leads to significant advantages during frame rate up-conversion when constructing new frames in the video sequence.

FIG. 7 is a flow diagram illustrating a method of estimating property values of a group of at least one image element in a frame to be constructed at a particular time instance in a video sequence relative an existing reference frame having a following or a previous time instance in the sequence. The method continues from step S3 of FIG. 2 or step S24 of FIG. 5. This means that the motion estimation method of the invention is first applied to the reference frame to assign motion representations to at least one uncovered group present in the uncovered region of the reference frame.

A next step S30 selects a reference group among the uncovered groups in the reference frame. This selected reference group has an assigned (global or local) motion representation intersecting the group to be determined in the constructed frame. This situation is illustrated in FIG. 3. Assume that the uncovered group 12 in the reference frame 10 is assigned the global motion representation 50 according to the present invention. In such a case, half the global motion, in the case the constructed frame 30 is positioned at a time instance $t_t$ in the middle of the time of the previous frame $t_{i-1}$ and the reference frame $t_{i+1}$, moves the reference group 12, when applied to the constructed frame 30, to the position of the current group 32 of image elements 31 to be determined. This means that the motion representations assigned to the uncovered groups 12 in the reference frame 10 are used when selecting the particular reference group to utilize as a basis for determining the pixel values of the image elements 31 in the group 32 to be determined. The reference group to use is, thus, the uncovered group 12 having a motion representation that pass through the group 32 in the constructed frame 30.

The property values of the image elements in the group are then estimated in step S31 based on the property values of the reference group. In an embodiment, this estimating step simply involves assigning the property values of the reference group to the respective image elements of the group. The property values may also be low pass filtering, as these groups may otherwise become to sharp compared to other groups that often become somewhat blurred as a consequence of the bidirectional interpolation. The method then ends.

It is anticipated by the present invention that for other groups of image elements in the frame to be constructed, a traditional bidirectional interpolation of property values based on a reference group in a preceding frame and another reference group in the following frame is performed according to prior art techniques. However, uncovered groups are handled according to the embodiment described above as they do not have any associated group in the previous (or following) frame.

In the above described embodiment a single reference group is utilized in the estimation of the property values for a current group. FIGS. 8 and 9 illustrate another embodiment utilizing two reference groups in different reference frames in the estimation. The method continues from step S30 of FIG. 7. A next step S40 identifies a second reference group 42 of at least one image element in a second reference frame 40 associated with a second different time instance in the video sequence 1. The two reference frames 10, 40 are positioned on a time basis on a same side in the video sequence 1 relative the constructed frame 30. Thus, the two reference frames 10, 40 could be two preceding frames, such as of time instances $t_{i-1}$ and $t_{i-3}$, or two following frames, such as of time instances $t_{i+1}$ and $t_{i+3}$, relative the time instance b of the constructed frame 30.

The second reference group 42 is identified in step S40 based on a motion representation assigned to the reference group 42. In a preferred embodiment, the second reference group 42 is identified as a group in the second reference frame 40 having an assigned motion representation pointing towards the first reference group 12 in the first reference frame 10.

The next step S41 extrapolates the property values of the image elements in the group 12 based on the property values of the first 12 and second 42 reference group. Such extrapolation procedures are well known in the art and may, for instance, involve different weights to the property values of the first reference group 12 as compared to the second reference group to thereby weight up the values of the first reference group 12, which is closer in time to the constructed frame 30 as compared to the second reference group 42.

FIG. 10 illustrates the advantages of utilizing the present invention during frame rate up-conversion as compared to prior art techniques lacking any true motion estimation for uncovered groups. The picture to the left has been constructed from a video sequence using prior art interpolation and extrapolation techniques. The corresponding picture to the right has been constructed according to the present invention. As is better seen in the two magnified picture portions, the present invention provides a more correct construction of the linesman to the right in the pictures.

The present invention is not only advantageously used in connection with frame rate up-conversion. The present invention can also be used for refining a motion vector field from the coded bit stream. This means that also uncovered groups previously having no assigned motion vectors will be assigned motion representations according to the invention.

Another application of the invention is for error concealment. A distorted frame or part of a frame can be replaced by unidirectional or bidirectional prediction using the refined vector field produced by the invention. The invention can also be used to obtain a predicted motion vector field from a reconstructed motion vector field as a mean to obtain better coding efficiency of a next frame to be decoded.

FIG. 11 is a schematic block diagram of a device for motion estimation for a group of at least one image element in a frame of a video sequence. A global motion determiner 110 is arranged in the device 100 for determining a representation of a global motion of image element property values from at least a portion of a reference frame to at least a portion of a current frame in the sequence. The determiner 110 is preferably connected to a set provider 140, which is arranged for providing a vector set comprising, for each image element group in the portion of the frame, a displacement vector referring to a reference group in the reference frame. The set provider 140 can fetch this set from an internal or external video codec, or include functionality for estimating the displacement vectors in a motion estimation search. The determiner 110 preferably generates the global motion representation as one of the previously described position-dependent global motion vectors, by determining matrix A and vector b of the global motion representation.

The device 100 also comprises a group identifier 120 for identifying uncovered groups of at least one image element each in an uncovered region of the frame based on the global motion representation from the determiner 110. This identifier 110 preferably identifies the uncovered groups as groups in the frame that does not have any associated group in the reference frame when applying the global motion from the groups in the frame to the reference frame. In a typical implementation, one then ends up outside the boundaries of the reference frame.

A motion assigner 130 assigns the global motion representation as motion representation or vector for those uncovered groups identified by the group identifier 120.

The device 100 optionally but preferably comprises a motion comparator 150 arranged for comparing motion representations of a set of groups. These groups are not present in the uncovered region of the frame but are neighbors to an uncovered group. The comparator 150 compares the motion representation of each of these neighboring groups to the global motion representation from the determiner 110 and investigates whether at least a minimum number of the motion representations differ significantly, i.e. with at least a minimum difference, from the global motion representation. This comparison is preferably performed as previously described herein.

If there is a local motion divergence in connection with the uncovered group, i.e. at least a minimum number of the tested neighboring motion representations differ significantly from the global motion representation the motion assigner 130 assigns a new motion representation to the uncovered group as a replacement of the global motion representation. This new motion representation is the motion representation of one of the neighboring groups having a significantly differing motion relative the global motion or is calculated based on at least a portion of the neighboring motions differing significantly from the global motion.

In an alternative embodiment, the motion comparator 150 also compares those neighboring motion representations that significantly differed from the global motion representation with each other. The comparator 150 then only signal the assigner 130 to re-assign motion representation for the uncovered group if these neighboring motion representations do not differ significantly, i.e. with not more than a maximum difference, from each other. The previously described comparison embodiments can be utilized by the comparator 150 for investigating this criterion. This means that the assigner 130 only assigns a new motion representation to the uncovered group if these two criteria are fulfilled as determined by the comparator 150.

If an uncovered group gets a re-assigned local motion representation by the assigner 130, the group identifier 120 preferably identifies other uncovered groups present on a same group row or column as the uncovered group but further away from the neighboring groups present in the remaining frame portion. In such a case, the motion assigner 130 re-assigns motion representations also for this (these) uncovered group(s). The re-assigned motion representation is the same as was previously assigned to the uncovered group adjacent the border between the uncovered region and the remaining frame region or a motion representation calculated at least partly therefrom, such as through extrapolation.

The units 110 to 150 of the motion estimating device 100 can be provided in hardware, software and/or a combination of hardware and software. The units 110 to 150 can be implemented in a video or frame processing terminal or server, such as implemented in or connected to a node of a wired or wireless communications system. Alternatively, the units 110 to 150 of the motion estimating device 100 can be arranged in a user terminal, such as TV decoder, computer, mobile telephone, or other user appliance having or being connected to a decoder and/or an image rendering device.

FIG. 12 is a schematic block diagram of a device 200 for estimating property values of a group of at least one image element in a constructed frame of video sequence. The device 200 comprises a motion estimating device 100 according to the present invention, illustrated in FIG. 11 and disclosed above. The motion estimating device is arranged for performing a motion estimation on a reference frame associated with a previous or following time instance in the video sequence relative the constructed frame. The motion estimation performed by the device 100 assigns global or local motion representations to at least one, preferably all, uncovered groups in the reference frame.

A group selector 210 is provided in the device 200 for selecting a reference group among the uncovered groups in the reference frame. The selector 210 preferably selects the reference group as an uncovered group having an assigned motion representation that intersects the group in the constructed frame. In other words, one passes straight through the group when traveling along the motion representation of the reference group from the reference frame towards another previous or following frame in the sequence.

The device 200 also comprises a value estimator 220 arranged for estimating the property values of the group based on the property values of the reference group selected by the group selector 210. The estimator 200 preferably assigns the property values of the reference group to the corresponding image elements of the group in the constructed frame.

In a preferred embodiment, the group selector 210 is also arranged for selecting a second reference group in a second reference frame in the video sequence. This second reference frame is preferably positioned further from the constructed frame regarding frame times as compared to the first reference frame. The second group is identified by the group selector 210 based on the motion representation assigned to the second reference group. The selector 210 typically selects the second reference group as a group in the second frame having an assigned motion representation pointing towards the first reference group in the first reference frame.

The estimator 220 then estimates the property values of the group based on the property values of both the first and second reference group. This value estimation is performed as a value extrapolation, preferably utilizing different weights for the values of the first and second reference group to thereby upweight those reference property values originating from the reference group that is positioned in a reference frame closer in time to the constructed group relative the other reference frame.

The units 100, 210 and 220 of the group estimating device 200 can be provided in hardware, software and/or a combination of hardware and software. The units 100, 210 and 220 can be implemented in a video or frame processing terminal or server, such as implemented in or connected to a node of a wired or wireless communications system. Alternatively, the units 100, 210 and 220 of the group estimating device 200 can be arranged in a user terminal, such as IV decoder, computer, mobile telephone, or other user appliance having or being connected to a decoder and/or an image rendering device.

It will be understood by a person skilled in the art that various modifications and changes may be made to the present invention without departure from the scope thereof, which is defined by the appended claims.

REFERENCES

[1] Chen, Y.-K., Vetro, Y.-K., Sun H., & Kung S.-Y., December 1998, Frame Rate Up-Conversion Using Transmitted True Motion, In IEEE Workshop on Multimedia Signal Processing.
[2] Wiegand T., Sullivan G. J., Bjontegaard G., & Luthra A., July 2003, Overview of the H.264/AVC Video Coding Standard, IEEE Transactions on Circuits and Systems for Video Technology, pages 1-19.

The invention claimed is:

1. A method of motion estimation for a group of at least one image element in a frame associated with a time instance in a video sequence, said method comprising the steps of:
determining a representation of a global motion of image element property values from at least a portion of a previous frame associated with a previous time instance in said video sequence to at least a portion of said frame, wherein the determining the representation of the global motion comprises estimating elements of a matrix A and a vector b based on a motion set, and wherein the motion set comprises, for each group in said at least a portion of said frame, a respective motion representation referring to an associated group in said previous frame, and wherein the global motion is represented as a vector v=Ax+b, wherein $v=[v_x v_y]^T$ is the global motion representation, $v_x$ is a first vector component of said global motion representation in a first direction, $v_y$ is a second vector component of said global motion representation in a second perpendicular direction, and $x=[x \ y]^T$ is an image element position in said frame;
identifying an uncovered group of at least one image element in an uncovered region of said frame based on said global motion representation; and
assigning said global motion representation to said uncovered group as motion estimation for said uncovered group.

2. The method according to claim 1, wherein said identifying step comprises identifying said uncovered group as a group in said frame that does not have an associated group in said previous frame when applying said global motion from said group in said frame to said previous frame.

3. The method according to claim 1, further comprising providing the motion set comprising, for each group in said at least a portion of said frame, the respective motion representation referring to the associated group in said previous frame, wherein said determining step comprises determining, based on at least a portion of the motion representations of said motion set, said global motion representation.

4. The method according to claim 3, wherein said determining step comprises determining, based on said at least a portion of the motion representations of said motion set, a position-dependent global motion representation.

5. The method according to claim 1, further comprising the steps of:
comparing, for said uncovered group having a neighboring set of neighboring groups not identified as belonging to said uncovered region, motion representations associated with said neighboring groups of said neighboring set with said global motion representation; and
assigning, to said uncovered group, a motion representation provided based on a motion representation associated with a neighboring group of said neighboring set if at least a minimum number of said motion representations differ from said global motion representation with at least a minimum difference.

6. The method according to claim 5, further comprising comparing said motion representations differing from said global motion representation with at least said minimum difference, wherein said assigning step comprises assigning, to said uncovered group, said motion representation provided based on said motion representation associated with said neighboring group of said neighboring set if said motion representations differing from said global motion representation with at least said minimum difference differ from each other with no more than a maximum difference.

7. The method according to claim 5, further comprising the steps of:
identifying at least one uncovered group present on a same group row or group column in said frame as said uncovered group but not having any neighboring groups not identified as corresponding to said uncovered region; and assigning, to said at least one uncovered group, a motion representation assigned to said uncovered group of said same group row or group column if said motion representation assigned to said uncovered group of said same group row or group column is different from said global motion representation.

8. A device for motion estimation for a group of at least one image element in a frame associated with a time instance in a video sequence, said device comprises:
a processor; and
a memory containing instructions executable by said processor, whereby said device is operative to:
determine a representation of a global motion of image element property values from at least a portion of a previous frame associated with a previous time instance in said video sequence to at least a portion of said frame, wherein the determining the representation of the global motion comprises estimating elements of a matrix A and a vector b based on a motion set, and wherein the motion set comprises, for each group in said at least a portion of said frame, a respective motion representation referring to an associated group in said previous frame, and wherein the global motion is represented as a vector v=Ax+b, wherein $v=[v_x \ v_y]^T$ is the global motion representation, $v_x$ is a first vector component of said global motion representation in a first direction, $v_y$ is a second vector component of said global motion representation in a second perpendicular direction, and $x=[x \ y]^T$ is an image element position in said frame;
identify an uncovered group of at least one image element in an uncovered region of said frame based on said global motion representation; and
assign said global motion representation to said uncovered group.

9. The device according to claim 8, wherein said device is further operative to identify said uncovered group as a group in said frame that does not have an associated group in said previous frame when applying said global motion from said group in said frame to said previous frame.

10. The device according to claim 8, wherein said device is further operative to provide the motion set comprising, for each group in said at least a portion of said frame, the respective motion representation referring to the associated group in said previous frame, wherein said device is further operative to determine, based on at least a portion of the motion representations of said motion set, said global motion representation.

11. The device according to claim 8, wherein said device is further operative to compare, for said uncovered group having a neighboring set of neighboring groups not identified as belonging to said uncovered region, motion representations associated with said neighboring groups of said neighboring set with said global motion representation, wherein said device is further operative to assign, to said uncovered group, a motion representation provided based on a motion representation associated with a neighboring group of said neighboring set if at least a minimum number of said motion representations differ from said global motion representation with at least a minimum difference.

12. The device according to claim 11, wherein
said device is further operative to compare said motion representations differing from said global motion representation with at least said minimum difference, and
said device is further operative to assign, to said uncovered group, said motion representation provided based on said motion representation associated with said neighboring group of said neighboring set if said motion representations differing from said global motion representation with at least said minimum difference differ from each other with no more than a maximum difference.

13. The device according to claim 11, wherein
said device is further operative to identify at least one uncovered group present on a same group row or group column in said frame as said uncovered group but not having any neighboring groups not identified as corresponding to said uncovered region, and
said device is further operative to assign, to said at least one uncovered group, a motion representation assigned to said uncovered group of said same group row or group column if said motion representation assigned to said uncovered group of said same group row or group column is different from said global motion representation.

* * * * *